United States Patent
Shimizu et al.

(10) Patent No.: US 10,967,455 B2
(45) Date of Patent: Apr. 6, 2021

(54) VEHICULAR DIFFERENTIAL DEVICE AND WELDING METHOD FOR THE SAME

(71) Applicant: TOYOTA JIDOSHA KABUSHIKI KAISHA, Toyota (JP)

(72) Inventors: Osamu Shimizu, Okazaki (JP); Nobuharu Imai, Toyota (JP); Yuji Suzuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 16/139,681

(22) Filed: Sep. 24, 2018

(65) Prior Publication Data

US 2019/0105730 A1 Apr. 11, 2019

(30) Foreign Application Priority Data

Oct. 10, 2017 (JP) .............................. JP2017-197228

(51) Int. Cl.
| | |
|---|---|
| B23K 15/00 | (2006.01) |
| B23K 26/21 | (2014.01) |
| F16H 48/38 | (2012.01) |
| B23K 33/00 | (2006.01) |
| B23K 101/00 | (2006.01) |

(Continued)

(52) U.S. Cl.
CPC .......... *B23K 15/0006* (2013.01); *B23K 15/00* (2013.01); *B23K 15/0013* (2013.01); *B23K 15/0093* (2013.01); *B23K 26/21* (2015.10); *B23K 33/00* (2013.01); *F16H 48/38* (2013.01); *B23K 2101/006* (2018.08); *B23K 2101/008* (2018.08); *B23K 2103/04* (2018.08); *F16H 48/08* (2013.01); *F16H 2048/385* (2013.01)

(58) Field of Classification Search
CPC ........................... B23K 15/0006; B23K 33/00; B23K 15/0093; B23K 15/0013; B23K 2101/008; B23K 15/00; B23K 26/21; B23K 2103/04; F16H 48/38; F16H 48/08; F16H 2048/385; B32K 15/00; B32K 26/21
See application file for complete search history.

(56) References Cited

U.S. PATENT DOCUMENTS

2016/0169360 A1* 6/2016 Yanase .................... F16H 48/40
475/230
2017/0089440 A1* 3/2017 Shirakawa ........... B23K 26/211

FOREIGN PATENT DOCUMENTS

| DE | 102016218087 A1 | 3/2017 |
|---|---|---|
| JP | 2010-207850 A | 9/2010 |
| JP | 2010207850 A * | 9/2010 |

(Continued)

OTHER PUBLICATIONS

Machine translation of JP2010-207,850A, Sep. 2020.*

*Primary Examiner* — Geoffrey S Evans
(74) *Attorney, Agent, or Firm* — Oliff PLC

(57) ABSTRACT

A vehicular differential device includes a differential case, a ring gear, and a welded portion positioned on an abutting surface where the differential case and the ring gear are in contact with each other. The welded portion is configured to join the differential case and the ring gear for integral rotation of the differential case and the ring gear around a rotation axis of the vehicular differential device. The welded portion includes a plurality of welding surfaces positioned at predetermined intervals along a circumferential direction around the rotation axis.

6 Claims, 3 Drawing Sheets

(51) Int. Cl.
*F16H 48/08* (2006.01)
*B23K 103/04* (2006.01)

(56) References Cited

FOREIGN PATENT DOCUMENTS

| | | | | |
|---|---|---|---|---|
| JP | 2010242930 A | * | 10/2010 | ............ F16H 48/08 |
| JP | 2012067889 A | * | 4/2012 | |
| JP | 2013-018035 A | | 1/2013 | |
| JP | 5687577 B2 | | 3/2015 | |

* cited by examiner

VEHICULAR DIFFERENTIAL DEVICE AND WELDING METHOD FOR THE SAME

INCORPORATION BY REFERENCE

The disclosure of Japanese Patent Application No. 2017-197228 filed on Oct. 10, 2017 including the specification, drawings and abstract is incorporated herein by reference in its entirety.

BACKGROUND

1. Technical Field

The present disclosure relates to a vehicular differential device and a welding method for the same. The present disclosure relates to a lightweight vehicular differential device structure that is easily reduced in size.

2. Description of Related Art

Vehicular differential device weight reduction is desired for fuel economy improvement. For example, in the differential device that is disclosed in Japanese Unexamined Patent Application Publication No. 2010-207850 (JP 2010-207850 A), an abutting surface between a differential case and a ring gear is joined by being welded over the entire circumference. As a result, weight reduction can be achieved from removal of a bolt used for fastening of the differential case and the ring gear and size reduction is facilitated as no bolt fastening place is needed. Fuel economy improvement can be achieved from the above.

SUMMARY

The differential case is formed by casting for the complex shape thereof. In the interest of fluidity and so on, cast iron such as relatively carbon-rich ferrum casting ductile (FCD: JIS Standards) is widely used as the material of the differential case. In a case where the cast iron-based differential case and the steel ring gear are welded over the entire circumference of the circumferential direction of a rotation axis, a crack may develop from casting defects such as a blow hole, a crack, and a borehole in the welded portion between the differential case and the ring gear to result in partial missing of the welded portion.

The present disclosure provides a vehicular differential device and a welding method for the same capable of further suppressing crack development likely to occur in a welded portion between a differential case and a ring gear and starting from a defect in a material.

A first aspect of the present disclosure relates to a vehicular differential device including a differential case, a ring gear, and a welded portion positioned on an abutting surface where the differential case and the ring gear are in contact with each other. The welded portion is configured to join the differential case and the ring gear for integral rotation of the differential case and the ring gear around a rotation axis of the vehicular differential device. The welded portion includes a plurality of welding surfaces positioned at predetermined intervals along a circumferential direction around the rotation axis.

In the vehicular differential device according to the first aspect of the present disclosure, at least one of the differential case and the ring gear may have a plurality of recessed portions where the differential case and the ring gear do not abut against each other along the circumferential direction around the rotation axis in the abutting surface. The welding surface may be positioned on the abutting surface between the differential case and the ring gear other than the recessed portion.

In the vehicular differential device according to the first aspect of the present disclosure, the differential case may be formed of a cast iron material.

A second aspect of the present disclosure relates to a welding method for a vehicular differential device including a differential case and a ring gear. The welding method includes forming, by welding, a welded portion positioned on an abutting surface where the differential case and the ring gear are in contact with each other. The welded portion joins the differential case and the ring gear for integral rotation of the differential case and the ring gear around a rotation axis of the vehicular differential device. The welded portion includes a plurality of welding surfaces positioned at predetermined intervals along a circumferential direction around the rotation axis.

In the welding method according to the second aspect of the present disclosure, the welded portion may be formed by electron beam welding or laser beam welding.

According to the first aspect of the present disclosure, the vehicular differential device is provided with the differential case, the ring gear, and the welded portion positioned on the abutting surface where the differential case and the ring gear are in contact with each other. The welded portion is configured to join the differential case and the ring gear for integral rotation of the differential case and the ring gear around the rotation axis, and the welded portion includes the welding surfaces positioned at predetermined intervals along the circumferential direction around the rotation axis. As a result, even when a crack occurs in the welding surface, development of the crack in the welding surface to the adjacent welding surface is further suppressed because of the presence of the unwelded gap between the welding surface and the welding surface.

According to the first aspect of the present disclosure, at least one of the differential case and the ring gear has the recessed portions where the differential case and the ring gear do not abut against each other along the circumferential direction around the rotation axis in the abutting surface. The welding surface is positioned on the abutting surface between the differential case and the ring gear other than the recessed portion. As a result, even when a crack occurs in the welding surface, development of the crack in the welding surface to the adjacent welding surface is further suppressed because of the presence of the unwelded gap between the welding surface and the welding surface, and the stress that is generated in the interface between the welding surface and the unwelded surface as a result of the welding can be further suppressed by a change in the shape of the interface between the welding surface and the unwelded surface, that is, the shape of the recessed portion.

According to the first aspect of the present disclosure, the differential case is formed of a cast iron material. In the above-described structure, crack development in the welding surface is further suppressed also in the differential case formed of the cast iron material likely to cause a crack in the welding surface during welding.

According to the second aspect of the present disclosure, the welding method for the vehicular differential device including the differential case and the ring gear includes the welding-based forming of the welded portion positioned on the abutting surface where the differential case and the ring gear are in contact with each other. The welded portion joins the differential case and the ring gear for integral rotation of the differential case and the ring gear around the rotation axis of the vehicular differential device. The welded portion includes the welding surfaces positioned at predetermined intervals along the circumferential direction around the rotation axis. As a result, even when a crack occurs in the welding surface, development of the crack in the welding surface to the adjacent welding surface is further suppressed because of the presence of the unwelded gap between the welding surface and the welding surface.

According to the second aspect of the present disclosure, the welded portion is formed by electron beam welding or laser beam welding. By the use of electron beam welding or laser beam welding, no crack is likely to occur in the welding surface and satisfactory welding can be performed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an example of the present disclosure will be described in detail with reference to accompanying drawings. In the following example, the drawings are appropriately simplified or modified and the dimension ratio, the shape, and so on of each part are not necessarily drawn in an accurate manner.

Figure 1:
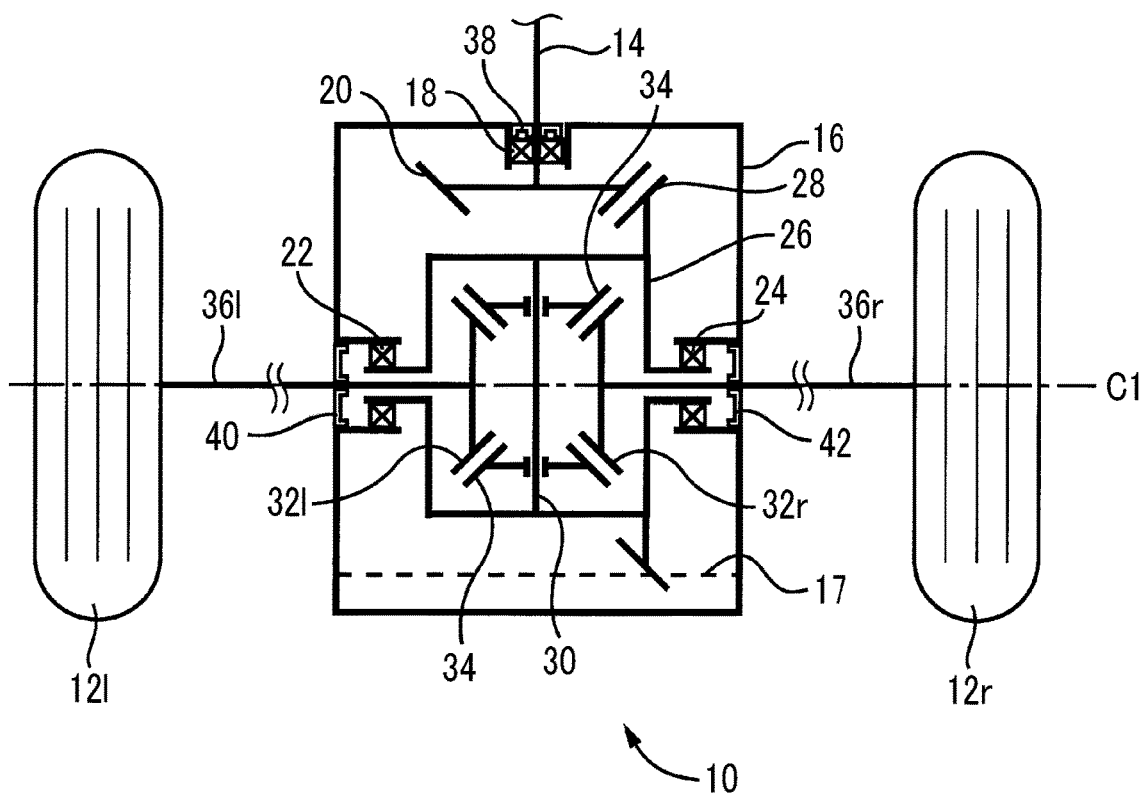
FIG. 1 is a schematic configuration diagram illustrating a vehicular differential device to which the present disclosure is applied.

FIG. 1 is a skeleton diagram schematically illustrating a vehicular differential device 10 to which the present disclosure is suitably applied. The vehicular differential device 10 illustrated in FIG. 1 is, for example, disposed to correspond to a pair of right and left rear wheels 12r, 12l as drive wheels. The vehicular differential device 10 is a differential gear device distributing a drive force input via an input shaft (drive pinion shaft) 14 to the rear wheels 12r, 12l while allowing differential rotation of the rear wheels 12r, 12l. Although the drive wheels are the rear wheels 12 in the present example, the same applies to a case where front wheels are drive wheels. The input shaft 14 is, for example, connected to the shaft end of a propeller shaft via a universal joint. The input shaft 14 is configured such that the drive force that is output by a drive force source (not illustrated) is transmitted to the input shaft 14 via a transmission, the propeller shaft, or the like.

The vehicular differential device 10 is provided with the input shaft 14 supported to be rotatable (rotatable on its own axis) by a housing 16 (case) via a bearing 18 in the housing 16 that is a non-rotating member, a small-diameter bevel gear 20 formed in the end portion of the input shaft 14 that is on the inner portion side of the housing 16, a differential case 26 supported via a bearing 22 and a bearing 24 by the housing 16 to be rotatable (rotatable on its own axis) around a first rotation axis C1 (corresponding to a rotation axis, hereinafter, referred to as the "first rotation axis C1") as the axial center line of axles 36r, 36l orthogonal to the input shaft 14, a ring gear 28 fixed to the differential case 26 and meshing with the small-diameter bevel gear 20, a pinion shaft 30 fixed to the differential case 26 in a posture orthogonal to the first rotation axis C1, a pair of side gears 32r, 32l (hereinafter, referred to as "side gears 32" when not particularly distinguished) supported to be rotatable (rotatable on its own axis) around the first rotation axis C1 by the differential case 26 in a state of facing each other across the pinion shaft 30, and a pair of pinion gears 34 supported to be rotatable (rotatable on its own axis) by the pinion shaft 30 by being penetrated by the pinion shaft 30 and meshing with the side gears 32r, 32l, respectively.

In the vehicular differential device 10, the side gear 32l and the side gear 32r are connected to the left wheel axle 36l and the right wheel axle 36r (hereinafter, simply referred to as the "axles" when not particularly distinguished) driving the left rear wheel 12l and the right rear wheel 12r, respectively. A lubricant for lubricating each part is sealed in the housing 16. Accordingly, an oil seal 38 is disposed between the input shaft 14 and the housing 16 in the vicinity of the bearing 18. An oil seal 40 is disposed between the axle 36l and the housing 16 in the vicinity of the bearing 22. An oil seal 42 is disposed between the axle 36r and the housing 16 in the vicinity of the bearing 24. As a result, outflow of the lubricant accumulated in the housing 16 is prevented. The dashed line in the housing 16 exemplifies a liquid surface 17 of the lubricant stored in the bottom portion of the housing 16. As a result of rotation of the ring gear 28, the lubricant is scooped up and supplied to each part in the housing 16 such as the axles 36, the side gears 32, and the pinion gears 34.

Figure 2:
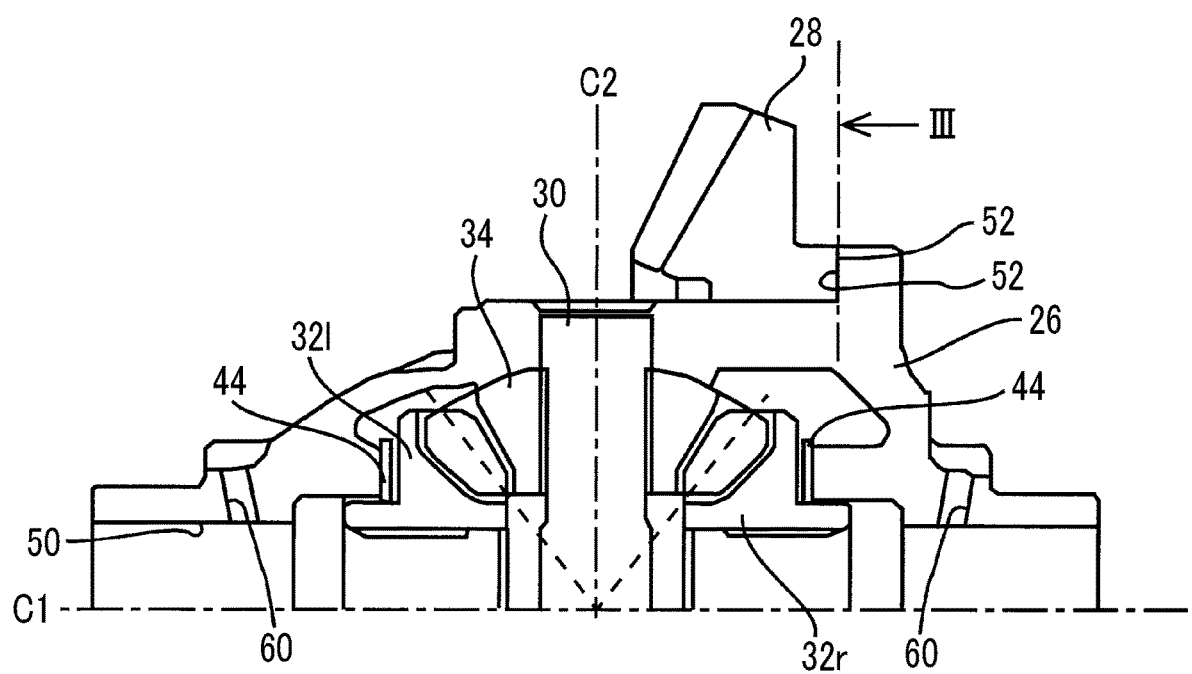
FIG. 2 is a diagram illustrating an example of a differential case and a ring gear disposed in the differential device illustrated in FIG. 1.

FIG. 2 is a sectional view illustrating the configuration of the differential case 26 and the inner portion of the differential case and the ring gear 28. Illustrated in FIG. 2 are the first rotation axis C1 and thereabove. The portion below the first rotation axis C1 has almost the same shape as the upper portion illustrated in FIG. 2. The ring gear 28 abuts against the differential case 26 on an abutting surface 52 and is joined by welding to the differential case 26. The differential case 26 is supported by the housing 16 via the bearings 22, 24 about the first rotation axis C1 of the axle 36, and the ring gear 28 and the differential case 26 integrally rotate about the first rotation axis C1 as the rotation center thereof as a result of rotation of the small-diameter bevel gear 20 meshing with the ring gear 28. Formed in the differential case 26 are an axle support hole 50 penetrating the differential case 26 in the first rotation axis C1 direction and rotatably supporting the axle 36 fitted therein, an oil groove 60 supplying the lubricant to the space between the axle support hole 50 and the axle 36, the pinion shaft 30 having a second rotation axis C2 orthogonal to the first rotation axis C1 and rotatably held in the differential case 26, the pinion gears 34 supported to be rotatable around a second rotation axis C2 by the pinion shaft 30, and the side gears 32r, 32l meshing with the pinion gears 34 and rotatably supported in the differential case 26 in a state of facing each other. A washer 44 is fitted between the side gears 32r, 32l and the differential case 26. In a case where a vehicle is turned during traveling, that is, in a case where rotation occurs in the pinion gears 34 and differential occurs with respect to the side gears 32r, 32l, friction attributable to a rotation speed difference between the differential case 26 and the side gears 32r, 32l is suppressed by the lubricant being held on both surfaces of the washer.

Figure 3:
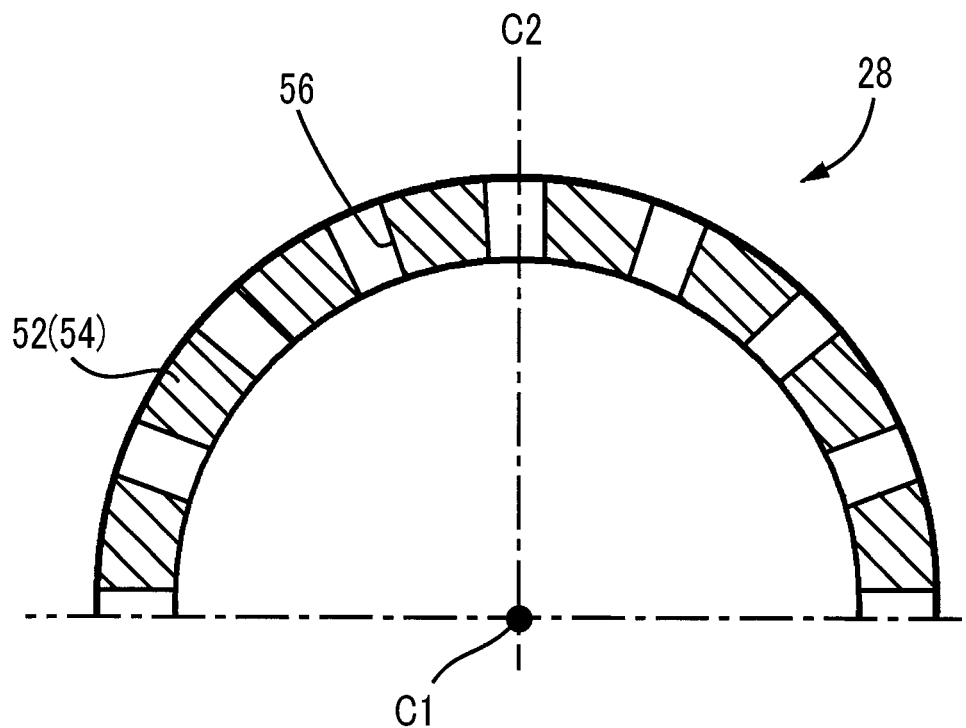
FIG. 3 is a diagram in which a welding surface of the ring gear illustrated in FIG. 2 is seen from the III side.

Illustrated in FIG. 3 is a shape in which a plurality of (16 in the present example) the abutting surfaces 52 of the ring gear 28, that is, surfaces of contact between the ring gear 28 and the differential case 26 is seen from the III side in FIG. 2. As in FIG. 2, merely the upper side of the first rotation axis C1 is illustrated and illustration of the lower side thereof is omitted. The abutting surfaces 52 of the ring gear 28 have recessed portions 56 radially formed from the first rotation axis C1 at regular intervals in the circumferential direction around the first rotation axis C1 and do not abut against the ring gear 28 in the recessed portions 56 formed between the abutting surfaces 52. Accordingly, the ring gear 28 and the differential case 26 are joined by welding surfaces 54 in the abutting surfaces 52 other than the recessed portions 56.

In the interest of material fluidity and so on, cast iron such as ferrum casting ductile (FCD: JIS Standards) with a carbon content of at least 2% is used for the differential case 26. Used for the ring gear 28 is, for example, a steel member obtained from a carburizing treatment of an SCM material (JIS Standards) or S09CK (JIS Standards) as low carbon steel or a member obtained by thermal processing for processability improvement being performed on ferrum casting ductile, gear cutting being performed thereon, and then surface hardening quenching being performed on the gear-cut part.

Figure 4:
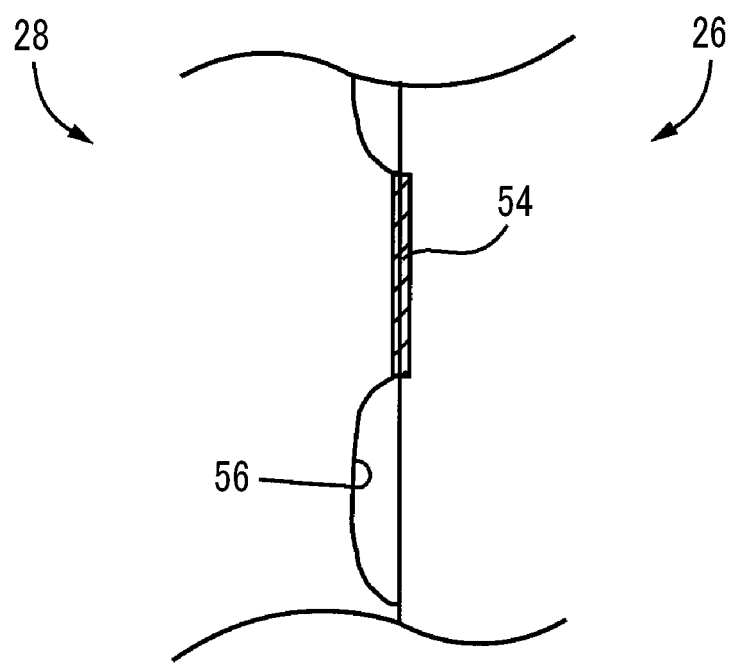
FIG. 4 is a diagram in which an example of a welding surface between the differential case illustrated in FIG. 2 and a ring gear having a recessed portion in an abutting surface is seen from the outer peripheral side.

FIG. 4 is an enlarged view in which the part at which processing of the recessed portion 56 is performed on the abutting surface 52 of the ring gear 28 and welding to the differential case 26 is performed on the welding surface 54, that is, the welding surface 54 between the ring gear 28 and the differential case 26 is seen from the outer peripheral side of the first rotation axis C1. Electron beam welding, laser welding, hot welding, metal inert gas (MIG) welding, or the like is used for the cast iron welding. Continuous welding is performed over the entire circumference of the circumferential direction of a first rotation axis C1 during the welding of the ring gear 28 and the differential case 26 according to the related art. The cast iron has defects such as a blow hole, a crack, and a borehole included in the cast iron, a crack occurs from the above-described defect during the welding, and power transmission in the vehicular differential device 10 may be hindered due to development of the above-described crack. During the welding illustrated in FIG. 4, the welding is intermittently performed by the recessed portion 56, no welding is performed on the recessed portion 56, and crack development is further suppressed by the unwelded part.

The vehicular differential device 10 according to the present example is provided with the differential case 26, the ring gear 28, and the welded portion positioned on the abutting surface 52 where the differential case 26 and the ring gear 28 are in contact with each other. The welded portion is configured to join the differential case 26 and the ring gear 28 for integral rotation of the differential case 26 and the ring gear 28 around the first rotation axis C1 of the vehicular differential device 10, and the welded portion includes the welding surfaces 54 positioned at predetermined intervals along the circumferential direction around the first rotation axis C1. As a result, even when a crack occurs in the welding surface 54, development of the crack in the welding surface 54 to the adjacent welding surface 54 is further suppressed because of the presence of the unwelded gap between the welding surface 54 and the other welding surface 54.

According to the present example, at least one of the differential case 26 and the ring gear 28 has the recessed portions 56 where the differential case 26 and the ring gear 28 do not abut against each other along the circumferential direction around the first rotation axis C1 in the abutting surface 52. The welding surface 54 is positioned on the abutting surface 52 between the differential case 26 and the ring gear 28 other than the recessed portion 56. As a result, even when a crack occurs in the welding surface 54, development of the crack in the welding surface to the adjacent welding surface 54 is further suppressed because of the presence of the unwelded gap between the welding surface 54 and the other welding surface 54, and the stress that is generated in the interface between the welding surface 54 and the unwelded surface as a result of the welding can be further suppressed by a change in the shape of the interface between the welding surface 54 and the unwelded surface, that is, the shape of the recessed portion 56.

According to the present example, the differential case 26 is formed of a cast iron material. In the above-described structure, crack development in the welding surface 54 is further suppressed by the unwelded surface also in the differential case 26 formed of the cast iron material likely to cause a crack in the welding surface 54 during welding.

According to the present example, the welding method for the vehicular differential device 10 including the differential case 26 and the ring gear 28 includes the welding-based forming of the welded portion positioned on the abutting surface 52 where the differential case 26 and the ring gear 28 are in contact with each other. The welded portion joins the differential case 26 and the ring gear 28 for integral rotation of the differential case 26 and the ring gear 28 around the first rotation axis C1 of the vehicular differential device 10. The welded portion includes the welding surfaces 54 positioned at predetermined intervals along the circumferential direction around the first rotation axis C1. As a result, even when a crack occurs in the welding surface 54, development of the crack in the welding surface 54 to the adjacent welding surface 54 is further suppressed because of the presence of the unwelded gap between the welding surface 54 and the other welding surface 54.

According to the present example, the welded portion is formed by electron beam welding or laser beam welding. By the use of electron beam welding or laser beam welding, no crack is likely to occur in the welding surface 54 and satisfactory welding can be performed.

Although the recessed portion is disposed in the ring gear 28 in the above-described example, the recessed portion may be disposed in the differential case 26 instead. Alternatively, the recessed portion 56 may be disposed in each of the ring gear 28 and the differential case. In addition, the recessed portion 56 of the ring gear 28 and the recessed portion 56 of the differential case can be installed at substantially the same facing positions on a radial line about the first rotation axis C1 or installed at non-facing positions.

Although the entire abutting surface 52 other than the recessed portion 56 is welded in the above-described example, a partially unwelded portion also may be disposed by welding of a part of the abutting surface 52 other than the recessed portion 56.

Another example of the present disclosure will be described below. In the following description, the same reference numerals will be used to refer to parts common to both examples and description thereof will be omitted.

Figure 5:
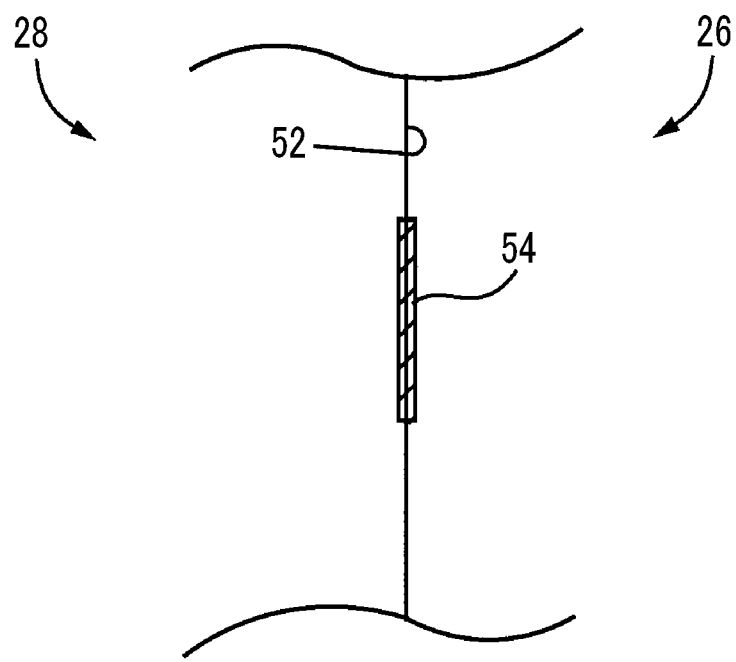
FIG. 5 is a diagram in which an example of a welding surface between the differential case illustrated in FIG. 2 and a ring gear having a flat abutting surface is seen from the outer peripheral side.

The abutting surface 52 between the differential case 26 and the ring gear 28 is illustrated in FIG. 5. Although the recessed portion 56 is disposed in at least one of the differential case 26 and the ring gear 28 on the abutting surface 52 in the above-described example, the present example differs from the above-described example in that the recessed portion 56 is disposed neither in the differential case 26 nor in the ring gear 28. In the present example, welding is performed by a part of the abutting surface 52 being welded, that is, at intervals along the circumferential direction of the first rotation axis C1.

The vehicular differential device 10 according to the present example is provided with the differential case 26, the ring gear 28, and the welded portion positioned on the abutting surface 52 where the differential case 26 and the ring gear 28 are in contact with each other. The welded portion is configured to join the differential case 26 and the ring gear 28 for integral rotation of the differential case 26 and the ring gear 28 around the first rotation axis C1, and the welded portion includes the welding surfaces 54 positioned at predetermined intervals along the circumferential direction around the first rotation axis C1. As a result, even when a crack occurs in the welding surface 54, development of the crack in the welding surface 54 to the adjacent welding surface 54 is further suppressed because of the presence of the unwelded gap between the welding surface 54 and the other welding surface 54.

Although examples of the present disclosure have been described above with reference to drawings, an applicable embodiment of the present disclosure is not limited to the above-described embodiment. That is merely an embodiment. An applicable embodiment of the present disclosure can be implemented in various forms modified and improved based on the knowledge of those skilled in the art.

What is claimed is:

1. A vehicular differential device comprising:
   a differential case;
   a ring gear; and
   a welded portion positioned on an abutting surface where the differential case and the ring gear are in contact with each other, the welded portion being configured to join the differential case and the ring gear for integral rotation of the differential case and the ring gear around a rotation axis of the vehicular differential device and the welded portion including a plurality of welding surfaces positioned at predetermined intervals along a circumferential direction around the rotation axis, wherein:
   at least one of the differential case and the ring gear has a plurality of recessed portions where the differential case and the ring gear do not abut against each other along the circumferential direction around the rotation axis in the abutting surface; and
   the welding surface is positioned on the abutting surface between the differential case and the ring gear other than the plurality of recessed portions.

2. The vehicular differential device according to claim 1, wherein the differential case is formed of a cast iron material.

3. The vehicular differential device according to claim 1, wherein the plurality of recessed portions are spaced from each other by a respective abutting surface.

4. A welding method for a vehicular differential device including a differential case and a ring gear, the welding method comprising:
   forming, by welding, a welded portion positioned on an abutting surface where the differential case and the ring gear are in contact with each other, the welded portion joining the differential case and the ring gear for integral rotation of the differential case and the ring gear around a rotation axis of the vehicular differential device and the welded portion including a plurality of welding surfaces positioned at predetermined intervals along a circumferential direction around the rotation axis, wherein:
   at least one of the differential case and the ring gear has a plurality of recessed portions where the differential case and the ring gear do not abut against each other along the circumferential direction around the rotation axis in the abutting surface; and
   the welding surface is positioned on the abutting surface between the differential case and the ring gear other than the plurality of recessed portions.

5. The welding method according to claim 4, wherein the welded portion is formed by electron beam welding or laser beam welding.

6. The welding method according to claim 4, wherein the plurality of recessed portions are spaced from each other by a respective abutting surface.

* * * * *